July 2, 1935.  A. E. DELANEY  2,006,884
BRAKE BEAM SAFETY HANGER
Filed Aug. 6, 1934
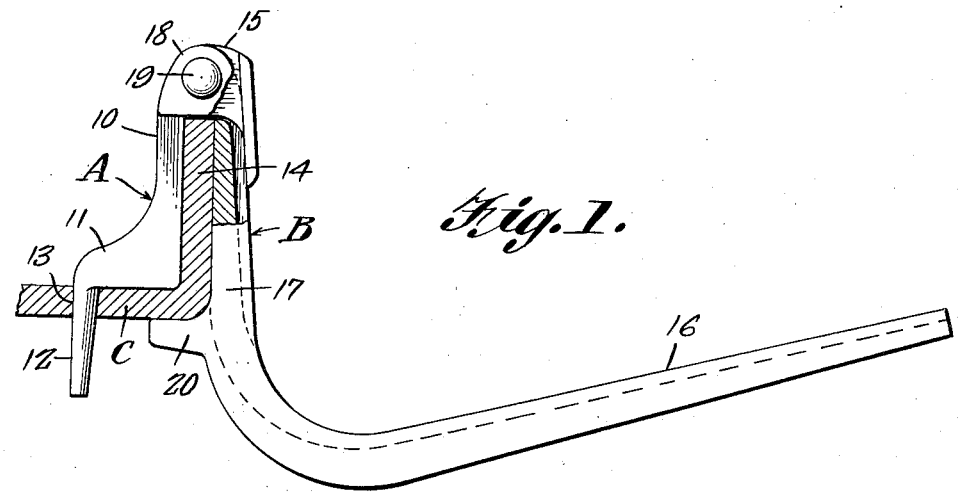
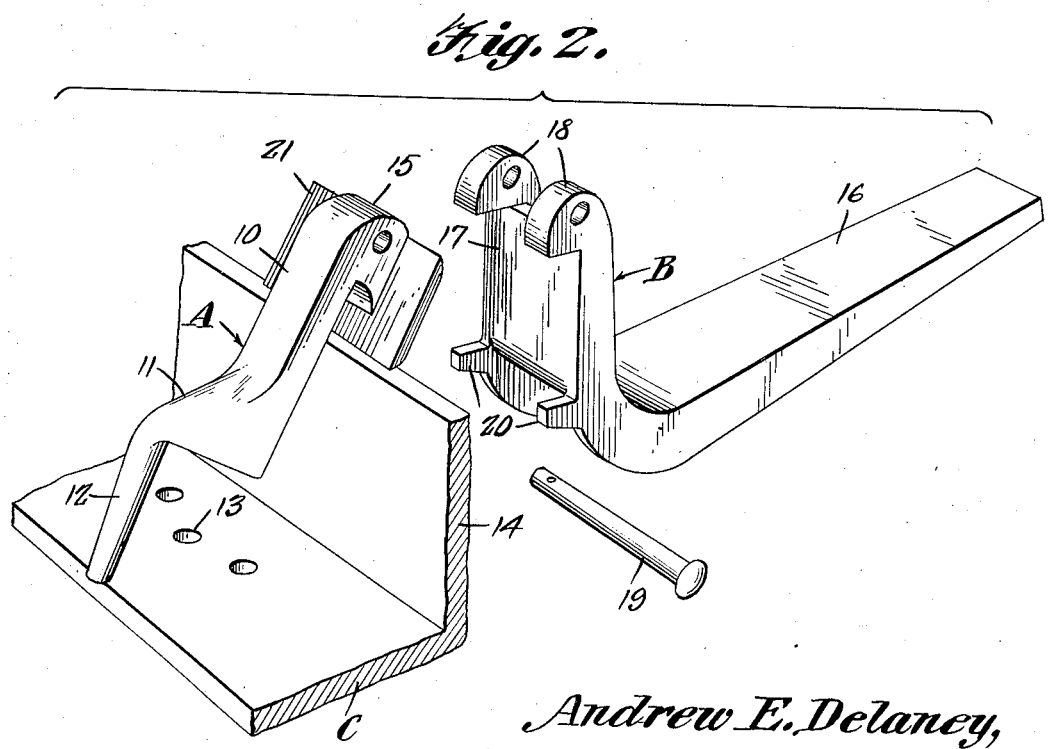

Patented July 2, 1935

2,006,884

UNITED STATES PATENT OFFICE 2,006,884

BRAKE BEAM SAFETY HANGER

Andrew E. Delaney, Ashland, Wis.

Application August 6, 1934, Serial No. 738,707

5 Claims. (Cl. 188—210)

The invention relates to a safety device and more especially to a brake beam safety hanger for railway freight cars.

The primary object of the invention is the provision of a hanger of this character, wherein the construction thereof is novel in form, so that it can be made secure upon a supporting truck member to prevent the falling of a brake beam to the roadbed and may be quickly and easily detached from the truck member to permit of the ready removal of the brake beam for repair or other purposes.

Another object of the invention is the provision of a hanger of this character, wherein the attachment thereof to a supporting truck member is unique and cannot possibly work loose nor can it be detached without the removal of a retaining pin, there being no springs employed, and such hanger will prevent the falling of the brake beam and will avoid vibration and rattling during use thereof.

A further object of the invention is the provision of a hanger of this character which is extremely simple in its construction, thoroughly reliable and efficient in its purpose, readily and easily attached to and detached from a truck member, strong, durable, and inexpensive to manufacture and install.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:

Figure 1 is a side elevation of a hanger embodying the invention, the same being illustrated as applied to the spring plank of a truck.

Figure 2 is an exploded perspective view of the parts shown in Figure 1.

Similar reference characters indicate corresponding parts throughout the several views in the drawing.

The safety hangers embodying the present invention are used in pairs, the same being applied to the spring plank of a truck and spaced apart so that the end of a truck beam accidentally released will be caught and held against falling to the roadbed.

Each hanger comprises a pair of members A and B, respectively, and this member A comprises a jaw 10 having the offset base 11 provided with a key 12, the latter being adapted for reception within a hole 13 provided therefor in the spring plank C of a truck. The jaw 10 is placed against the upstanding flange 14 of said plank C and has formed at its upper end a pintle eye 15, the latter being adapted to overhang the flange 14 of the plank C when the member A is in position thereon.

The member B includes a fender arm 16 which is formed with an upstanding jaw 17 having at its upper end the pair of spaced pintle eyes 18 to straddle the pintle eye 15 of the member A and received in these pintle eyes, which are adapted to align with each other, is a retaining pin 19, thus joining the members A and B together, the jaw 17 of the arm 16 being disposed against the outer side of the flange 14. This jaw 17 carries a pair of spaced lugs 20 which project immediately beneath the plank C.

Formed on the eye 15 and disposed crosswise with respect to the eyes 18 to overlap these and also a considerable portion of the jaw 17 of the member B is a plate 21 which maintains the member A and B interfitted with each other and against the opposite faces of the flange 14 of the plank C, so that should the pin 19 become accidentally freed these members cannot separate from each other or become detached from the plank.

To remove the hanger it is necessary to release the pin 19 from the eyes 15 and 18 of the respective members A and B and thereafter the member A is lifted for extracting the key 12 from the hole 13 and on the lifting of this member it is freed from the member B, so that the latter can be detached from the plank C.

It will be noted that there is a series of spaced holes 13, these being out of alignment with each other and the purpose thereof being to permit the device to accommodate itself to any make of truck requiring a different space from the edge of the spring clamp.

What is claimed is:

1. A brake beam safety hanger comprising hinged members including jaws for engagement at opposite faces of a flange of a spring plank, and a plate on one member and bridging the other member to hold said members interfitted with each other.

2. A brake beam safety hanger comprising hinged members including jaws for engagement at opposite faces of a flange of a spring plank, a plate on one member and bridging the other member to hold said members interfitted with each other, and a key engageable with the plank and upon one of the members.

3. A brake beam safety hanger comprising hinged members including jaws for engagement at opposite faces of a flange of a spring plank, a plate on one member and bridging the other member to hold said members interfitted with each other, a key engageable with the plank and upon one of the members, and lugs on the other member and engageable with said plank.

4. A brake beam safety hanger comprising hinged members including jaws for engagement at opposite faces of a flange of a spring plank, a plate on one member and bridging the other member to hold said members interfitted with each other, a key engageable with the plank and upon one of the members, lugs on the other member and engageable with said plank, and a pin releasably hinging the said members together.

5. A brake beam safety hanger comprising hinged members including jaws for engagement at opposite faces of a flange of a spring plank, a plate on one member and bridging the other member to hold said members interfitted with each other, a key engageable with the plank and upon one of the members, lugs on the other member and engageable with said plank, a pin releasably hinging the said members together, and a fender arm formed with one of said members.

ANDREW E. DELANEY.